(12) United States Patent
Sawada et al.

(10) Patent No.: US 8,497,763 B2
(45) Date of Patent: Jul. 30, 2013

(54) DATA CARRIER AND DATA CARRIER SYSTEM

(75) Inventors: Kikuzo Sawada, Tokyo (JP); Takashi Kubo, Tokyo (JP); Yoshikazu Sugawara, Tokyo (JP); Kenji Suzuki, Kanagawa (JP)

(73) Assignees: Yoshikawa RF Systems Co., Ltd., Kitakyushu (JP); Fuji Xerox Co., Ltd., Tokyo (JP)

( * ) Notice: Subject to any disclaimer, the term of this patent is extended or adjusted under 35 U.S.C. 154(b) by 1121 days.

(21) Appl. No.: 12/513,591

(22) PCT Filed: Nov. 27, 2007

(86) PCT No.: PCT/JP2007/072840
§ 371 (c)(1),
(2), (4) Date: May 5, 2009

(87) PCT Pub. No.: WO2008/066034
PCT Pub. Date: Jun. 5, 2008

(65) Prior Publication Data
US 2010/0052860 A1    Mar. 4, 2010

(30) Foreign Application Priority Data

Nov. 27, 2006   (JP) ................................ 2006-319151

(51) Int. Cl.
*H04Q 5/22* (2006.01)
(52) U.S. Cl.
USPC ..... 340/10.1; 340/572.8; 340/10.2; 340/10.5; 340/505; 340/572.1; 340/572.2
(58) Field of Classification Search
None
See application file for complete search history.

(56) References Cited

U.S. PATENT DOCUMENTS

| | | | | |
|---|---|---|---|---|
| 6,003,777 A * | 12/1999 | Kowalski | | 235/492 |
| 6,375,082 B1 * | 4/2002 | Kobayashi et al. | | 235/492 |
| 6,836,208 B2 * | 12/2004 | Kuttruff et al. | | 340/10.51 |
| 6,899,277 B2 * | 5/2005 | Kawano et al. | | 235/492 |
| 7,178,737 B2 * | 2/2007 | Ohyama | | 235/492 |
| 7,255,284 B2 * | 8/2007 | Kim et al. | | 235/492 |
| 7,834,753 B2 * | 11/2010 | Sugawara et al. | | 340/505 |
| 7,866,568 B2 * | 1/2011 | Tsujii | | 235/492 |
| 8,186,600 B2 * | 5/2012 | Cho | | 235/492 |
| 2001/0049775 A1 | 12/2001 | Rechberger et al. | | |
| 2003/0163717 A1 | 8/2003 | Yoshimoto et al. | | |
| 2004/0050942 A1 | 3/2004 | Ueda et al. | | |
| 2004/0250037 A1 | 12/2004 | Takemura et al. | | |

FOREIGN PATENT DOCUMENTS

| | | |
|---|---|---|
| JP | A-02-109188 | 4/1990 |
| JP | A-10-124626 | 5/1998 |
| JP | A-10-312445 | 11/1998 |
| JP | A-2000-285207 | 10/2000 |

(Continued)

*Primary Examiner* — Benjamin C Lee
*Assistant Examiner* — Rajsheed Black-Childress
(74) *Attorney, Agent, or Firm* — Oliff & Berridge, PLC

(57) ABSTRACT

The data carrier has a communication protocol storage unit storing a communication protocol for communicating with an external communication device, an RF analogue receiver receiving an interrogation signal from the external communication device as an RF signal, a contact communication end terminal unit performing contact communication with the external communication device, a communication command controller controlling a command used in an RF communication protocol performed via said RF analogue receiver or a contact-type serial communication protocol performed via said contact communication end terminal unit, and a connection selector selectively connecting one of said RF analogue receiver and said contact communication end terminal unit with said communication command controller.

6 Claims, 7 Drawing Sheets

FOREIGN PATENT DOCUMENTS

| | | |
|---|---|---|
| JP | A-2001-134151 | 5/2001 |
| JP | A-2001-291079 | 10/2001 |
| JP | A-2002-288616 | 10/2002 |
| JP | A-2003-256282 | 9/2003 |
| JP | A-2003-528404 | 9/2003 |
| JP | A-2004-086870 | 3/2004 |
| JP | A-2004-214879 | 7/2004 |
| JP | A-2004-310557 | 11/2004 |
| JP | A-2006-309331 | 11/2006 |

* cited by examiner

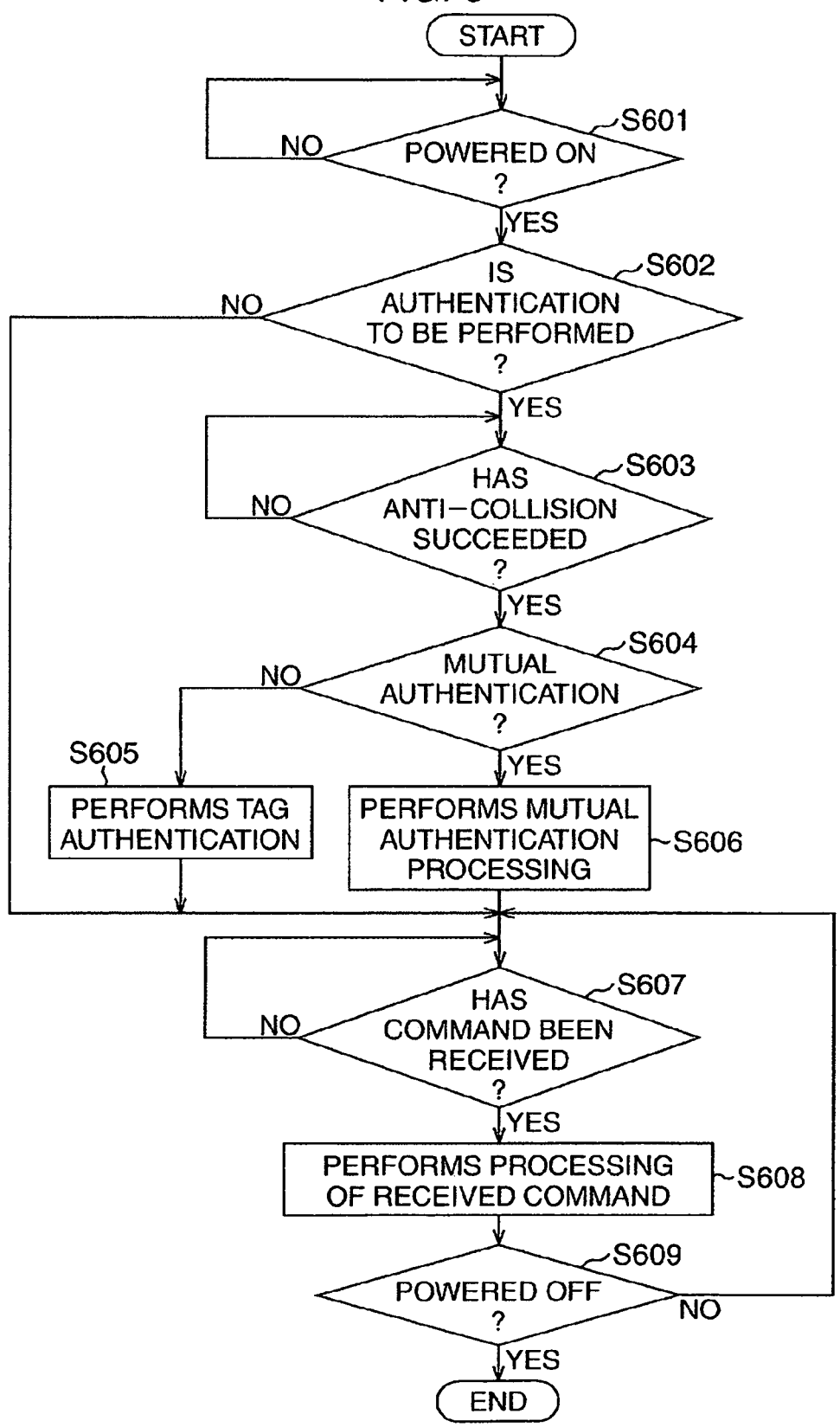

DATA CARRIER AND DATA CARRIER SYSTEM

TECHNICAL FIELD

The present invention relates to a data carrier and a data carrier system, in particular, to a preferable technique for carrying out both RF communication and contact-type serial communication between the data carrier and a reader/writer device.

BACKGROUND ART

Conventionally, a data carrier system, which is composed of a data carrier and a reader/writer device to carry out contactless data transmission and reception between the data carrier and the reader/writer device, is practically applied in various fields. In such a data carrier system, an antenna installed in the data carrier receives an alternate magnetic field of carrier frequency supplied from the reader/writer device via an antenna circuit to obtain operating power.

The reader/writer device modulates the magnetic field and transmits an interrogation signal including a command or data, and the data carrier demodulates and receives the command or data transmitted from the reader/writer device.

On the other hand, when transmitting data to the reader/writer device, the data carrier transmits a response by turning on and off a conventional load switch connected to an antenna circuit installed therein, according to the content of the response signal to transmit. In such a structure, a double sideband carrier is used as frequency for responding from the data carrier, with respect to a carrier frequency of the alternate magnetic field supplied from an antenna circuit of the reader/writer device.

The data carrier is composed of a storage unit for storing information and an antenna for transmitting and receiving information in a contactless manner, to transmit and receive information in a contactless manner with the reader/writer device in use of electromagnetic fields or radio waves. Such data carrier is utilized in various fields, being referred to RFID, IC tag, ID tag, RF tag, radio tag, electronic tag, transponder, etc.

As applications of the data carrier system, data carriers are disposed to, for example, vending machines, game machines, electricity meters, gas meters, water meters, home electronics, office automation equipments and productive facilities and information such as operation histories, sales records and used amount is recorded in the storage unit of the data carrier.

The data carrier used in is various fields in various ways. Among those various usage patterns, a data communication device capable of performing both RF communication and contact-type serial communication with a reader/writer device is proposed (for example, see Patent Document 1).

A data communication device described in Patent Document 1 is composed of antenna coil, data communication unit for carrying out contactless data communication with an external communication device via the antenna coil and a data input and output end terminal for transmitting and receiving data to and from the other party, and a contact unit for contacting with the data input and output end terminal. With this structure, serial communication can be carried out via the data input and output end terminal and the contact unit.

The data carrier can be applied in various fields in various ways. A technique for performing communication with a reader/writer device and confirming whether the device component having the data carrier is a previously authenticated device component has been proposed.

[Patent Document 1] Japanese Patent Application Laid-Open No. 2004-214879
[Patent Document 2] Japanese Patent Application Laid-Open No. 2001-134151

SUMMARY OF THE INVENTION

In the above described data carrier capable of performing both RF communication and contact-type serial communication, different levels (types) of security function are often used in RF communication and contact-type serial communication. However, there has been a problem that the data communication device according to Patent Document 1 cannot switch the levels (types) of the security function corresponding to the type of the reader/writer device.

For example, when a data carrier attached to a device component transmits and receives information to and from a reader/writer device by RF communication, it is sometimes required to keep information not to be read by a particular communication party. However, when plural communication parties are allowed to access the security area, there has been a problem that it is difficult to prevent the information from being read by the particular communication party.

Further, types of conventional data carriers performing RF communications are broadly divided into tow: proximity data carriers and vicinity data carriers. The proximity data carriers use PICC commands and the vicinity data carriers use VICC commands. Accordingly, the proximity data carriers cannot communicate by VICC commands and the vicinity data carriers cannot communicate by PICC commands.

The present invention is made in view of the above problems and has an object to provide a data carrier capable of performing both RF communication and contact-type serial communication by using a single communication protocol, switching authentication methods that allow an access to a security level area corresponding to a command transmitted from an external communication device, and switching between proximity communication and vicinity communication.

A data carrier of the present invention has a communication protocol storage unit storing a communication protocol for communicating with an external communication device, an RF analogue receiver receiving an interrogation signal from the external communication device as an RF signal, a contact communication end terminal unit performing contact communication with the external communication device, a communication command controller controlling a command used in an RF communication protocol performed via the RF analogue receiver or a contact-type serial communication protocol performed via the contact communication end terminal unit, a connection selector selectively connecting one of the RF analogue receiver and the contact communication end terminal unit with the communication command controller, a contactless communication command controller controlling a proximity communication command for proximity communication with the external communication device and a vicinity communication command for vicinity communication with the external communication device, an authentication command analyzer analyzing an authentication level to be applied to the external communication device based on the interrogation signal received from the RF analogue receiver, and an authentication command selector selecting an authentication command used in an authentication process with the external communication device according to an analysis result in the authentication command analyzer. The communication command controller uses the communication protocol stored in the communication protocol storage unit to perform communication in both cases of selecting the RF analogue receiver or the contact communication end terminal unit.

A data carrier system of the present invention has a data carrier, and an external communication device communicating with the data carrier. The data carrier has a communication protocol storage unit storing a communication protocol for communicating with the external communication device, an RF analogue receiver receiving an interrogation signal from the external communication device as an RF signal, a contact communication end terminal unit performing contact communication with the external communication device, a communication command controller controlling a command used in an RF communication protocol performed via the RF analogue receiver or a contact-type serial communication protocol performed via the contact communication end terminal unit, a connection selector selectively connecting one of the RF analogue receiver and the contact communication end terminal unit with the communication command controller, a contactless communication command controller controlling a proximity communication command for proximity communication with the external communication device and a vicinity communication command for vicinity communication with the external communication device, an authentication command analyzer analyzing an authentication level to be applied to the external communication device based on the interrogation signal received from the RF analogue receiver, and an authentication command selector selecting an authentication command. used in an authentication process with the external communication device according to an analysis result in the authentication command analyzer. The communication command controller uses the communication protocol stored in the communication protocol storage unit to perform communication in both cases of selecting the RF analogue receiver or the contact communication end terminal unit.

BRIEF DESCRIPTION OF THE DRAWINGS

FIG. 8 is a flowchart showing an example communication of the data carrier system using the data carrier of the present embodiment.

DETAILED DESCRIPTION OF THE PREFERRED EMBODIMENTS

An embodiment of a data carrier system according to the present invention will be described with reference to the drawings.

Figure 1:
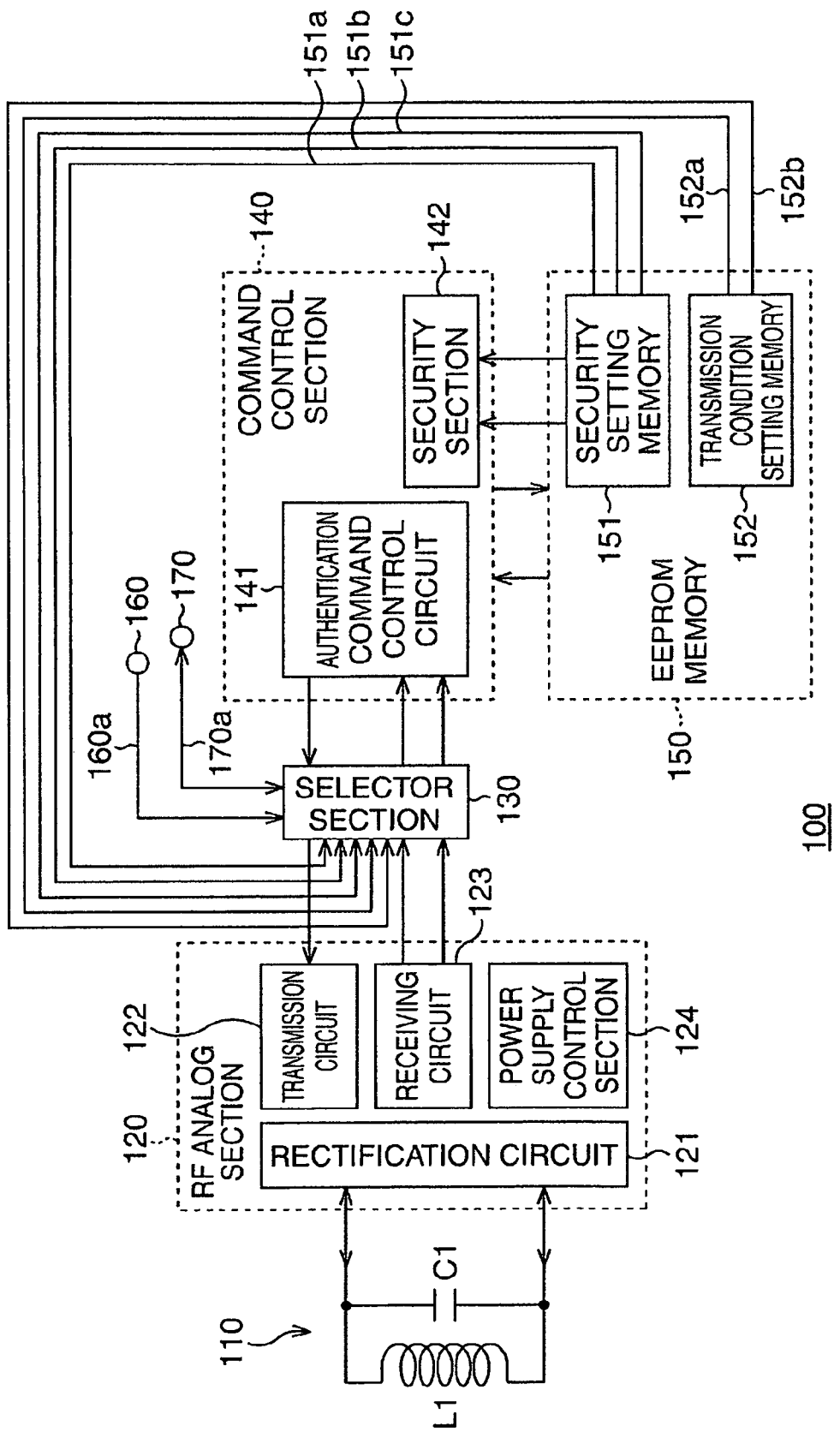
FIG. 1 is a block diagram showing a configuration of a data carrier according to an embodiment of the present invention.

As shown in FIG. 1, a data carrier 100 of the present embodiment has, for example, an antenna circuit 110, an RF analogue unit (RF analogue receiver) 120, a selecting unit 130, a command control unit 140, a storage unit 150 (EEPROM memory), a first contact terminal 160 and a second contact terminal 170.

The data carrier of the present embodiment can carry out both RF communication and contact-type serial communication. In case of the contact-type serial communication, the first contact terminal 160 is used to input a serial clock 160a and the second contact terminal 170 is used to input and output multipurpose data 170a.

The antenna circuit 110 is composed of a parallel resonant circuit formed with a coil L1 and a capacitor C1. The RF analogue unit 120 has a rectifying circuit 121, a transmission circuit 122, a reception circuit 123 and a power source control unit 124.

The command control unit 140 has a command control circuit 141 and a security unit 142. The storage unit 150 has a security setting memory 151 and a transmission condition setting memory 152. The commands stored in the security setting memory 151 and the transmission condition setting memory 152 are used in both RF communication and contact-type serial communication.

Figure 4:
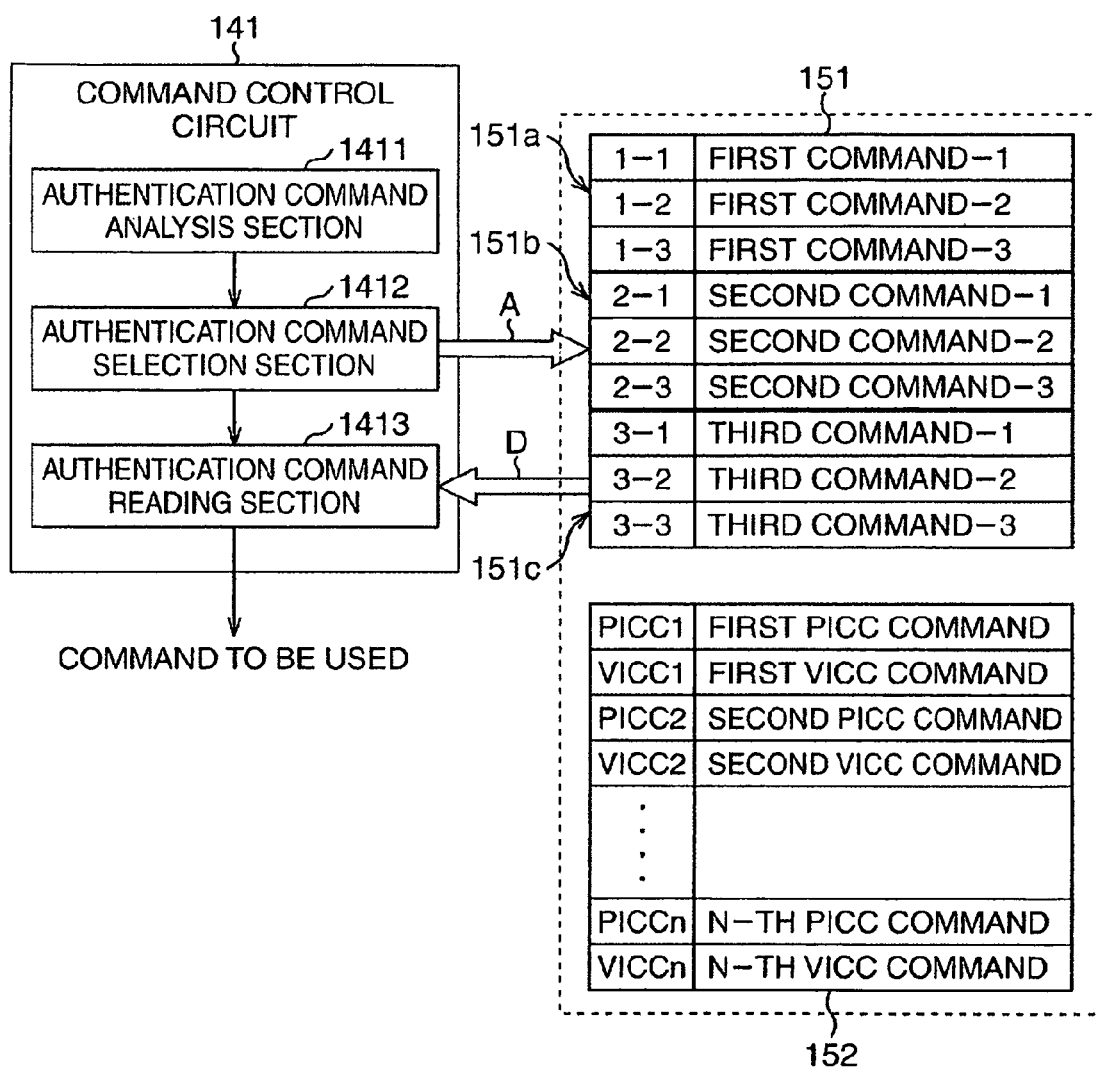
FIG. 4 is a diagram showing a configuration of a command control circuit of the present embodiment, in which the command control circuit reads one of commands corresponding to a security level.

FIG. 4 shows an example of the command. As shown in FIG. 4, according to the present embodiment, the security setting memory 151 includes a first security area 151a, a second security area 151b and a third security area 151c. In the FIG. 4, a "first command (1)" is stored in 1-1 of address 1 in the first security area 151a. Further, a "first command (2)" is stored in 1-2 of address 2 in the first security area 151a. Also, a "first command (3)" is stored in 1-3 of address 3 in the first security area 151a.

Further, a "second command (1)" is stored in 2-1 of address 1 in the second security area 151b. A "second command (2)" is stored in 2-2 of address 2 in the second security area 151b. In addition, a "second command (3)" is stored in 2-3 of address 3 in the second security area 151b.

Further, a "third command (1)" is stored in 3-1 of address 1 in the second security area 151c. A "third command (2)" is stored in 3-2 of address 2 in the second security area 151c. In addition, a "third command (3)" is stored in 3-3 of address 3 in the second security area 151c.

According to a control of the command control unit 140, one of the first commands (1) to (3), the second commands (1) to (3) and the third commands (1) to (3) is read from the security setting memory 151 and given to the selecting unit 130.

Figure 2:
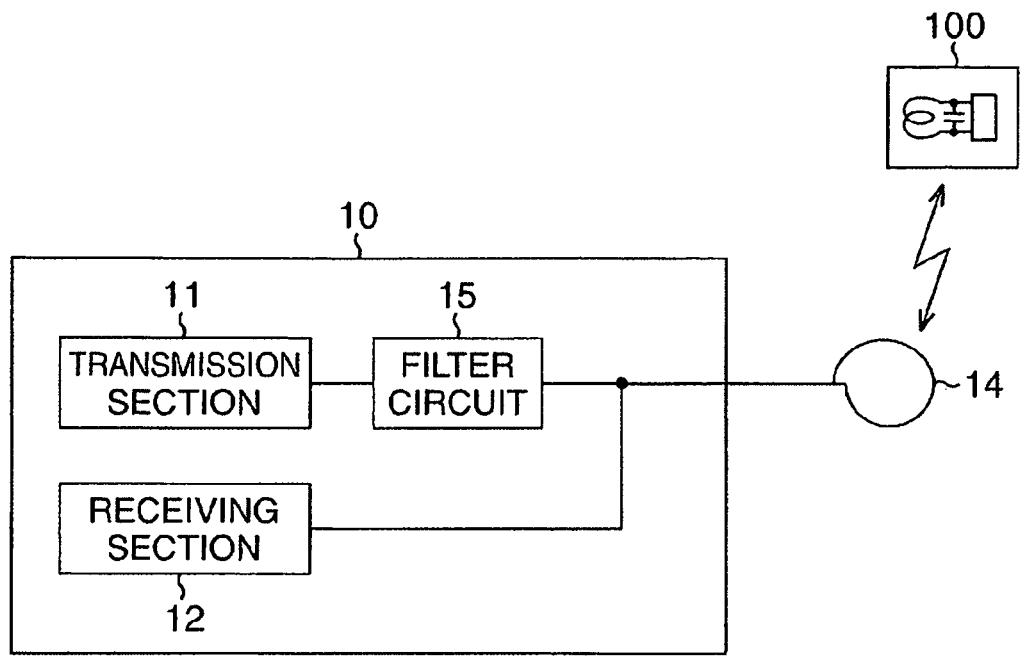
FIG. 2 is a diagram showing a schematic configuration of a data carrier system composed of a reader/writer device and the data carrier according to the embodiment of the present invention.

As shown in FIG. 2, the reader/writer device 10, which communicates with the data carrier 100 of the present embodiment, includes, for example, a transmitter 11, a receiver 12, an antenna circuit 14 and a filter circuit 15. Commands or data are transmitted to the data carrier 100 via the antenna circuit 14 so that RF communication is performed between the reader/writer device 10 and the data carrier 100.

The transmitter 11 modulates a predetermined carrier frequency f0 (13.56 MHz) to generate a transmission signal including a command or data to be transmitted to the data carrier 100. The receiver 12 decodes the subcarrier frequency transmitted from the data carrier 100 to demodulate the data.

The antenna circuit 14 transmits transmission signals output from the transmitter 11 to the data carrier 100 and receives response signals transmitted from the data carrier 100. The above described configuration is a typical configuration of the data carrier 100 applied in a data carrier system; however, the data carrier 100 of the present embodiment is applicable to both proximity data communications and vicinity data communications.

FIG. 4 shows a configuration for reading a command from one of the first security area 151a, second security area 151b and third security area 151c, and a configuration for reading one of a PICC command 152a or a VICC command 152b (see FIG. 1).

As shown in FIG. 4, the command control circuit 141 of the present embodiment has an authentication command analyzing unit 1411, an authentication command selecting unit 1412 and an authentication command reader 1413.

The authentication command analyzing unit 1411 determines whether the interrogation signal 41 from the reader/writer device 10 is one of "direct command," "tag authentication command," "mutual authentication command," "PICC command" and "VICC command," and outputs the determination result to the authentication command selecting unit 1412.

The authentication command selecting unit 1412 selects a command of a security area or a security level command for a response signal 42 to be transmitted to the reader/writer device 10 according to the command analysis result transmitted from the authentication command analyzing unit 1411, and specifies an address A, where the command of selected type is stored, to the security setting memory 151 and transmission condition setting memory 152.

The authentication command reader 1413 reads a command of the security area selected by the authentication command selecting unit 1412 or data D of the command of transmission condition setting area from the security setting memory 151 or the transmission condition setting memory 152, as a command used for communication with the reader/writer device 10.

As shown in FIG. 1, one of the commands read from the security setting memory 151 or the transmission condition setting memory 152 is output to the selecting unit 130.

Figure 3:
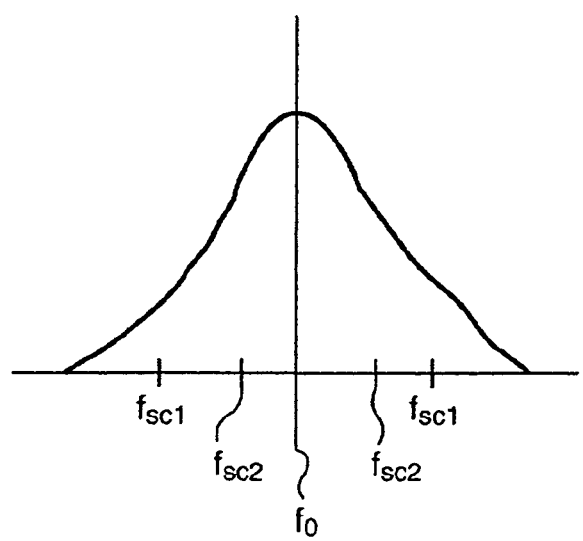
FIG. 3 is a waveform diagram showing an example of a data carrier signal.

When performing RF communication with the data carrier 100 of the present embodiment, as shown in FIG. 3, double sideband carriers are used with respect to carrier frequency of the alternate magnetic field supplied from the antenna circuit of the reader/writer device in first subcarrier frequency fsc1 and second subcarrier frequency fsc2, as a frequency for the response signal 42 in response to the interrogation signal 41 from the reader/writer device 10.

Further, when performing RF communication with the data carrier 100 of the present embodiment, both the vicinity communication command (VICC command) and the proximity communication command (PICC command) can be used selectively.

As shown in the explanatory view of the carrier frequency in FIG. 3, according to the present embodiment, the first subcarrier frequency fsc1 (847.5 kHz) is used as a primary proximity communication command (PICC command) and the second subcarrier frequency fsc1 (437.75 kHz) is used as a vicinity communication command (VICC). In its reception characteristic, the center frequency is 13.56 MHz, the communication speed is 105.94 kbps, and the modulation method is ASK (NRZ). In its transmission characteristic, the center frequency is 13.56 MHz, the communication speed is 105.94 kbps and the modulation method is BPSK (NRZ).

Further, according to the present embodiment, the subcarrier strength can be changed by increasing or reducing load. The degree of the change can be set in eight levels in each of the PICC command and the VICC command. Further, the relative ratio of the PICC command to the VICC command are set to be about 1:3.

Next, a modulation method for RF communication and a modulation method for contact-type serial communication will be described with reference to FIGS. 5A, 5B, 6A and 6B.

Figure 5A:
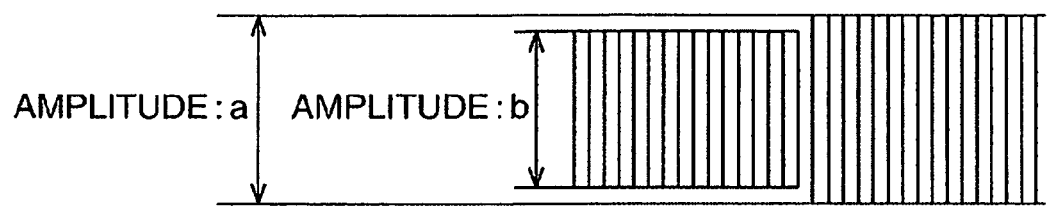
FIG. 5A is a diagram showing an example of a modulation method in a case that an interrogation signal is transmitted from the reader/writer device to the data carrier.
Figure 5B:
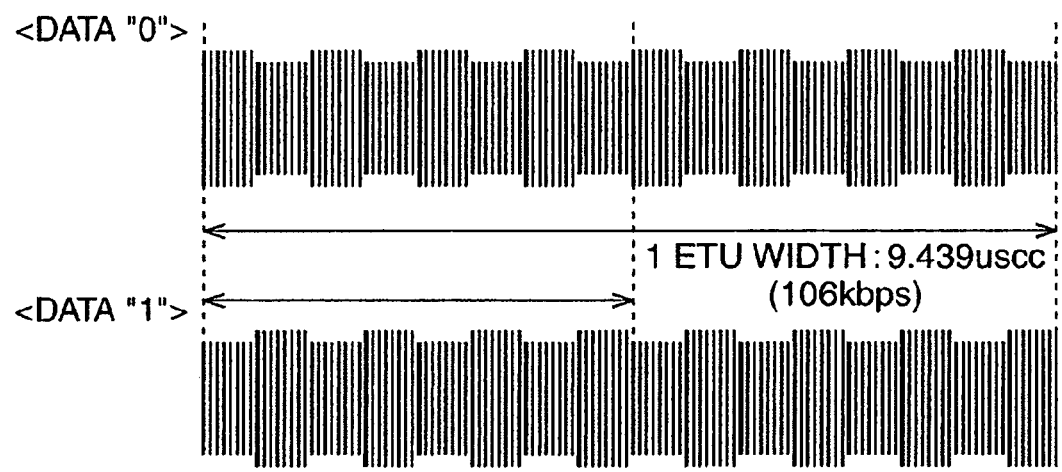
FIG. 5B is a diagram showing an example of a modulation method in a case that a response signal is transmitted from the data carrier to the reader/writer device.

FIGS. 5A and 5B are diagrams explaining a modulation method for RF communication and FIG. 5A shows a modulation method in case that the reader/writer device 10 transmits an interrogation signal 41 (see FIG. 2) to the data carrier 100.

In this case, the condition of the communication is set as (a) center frequency: 13.56 MHz, (b) communication speed: 105.94 kbps, (c) modulation method: ASK (NRZ), and (d) modulating speed: from 10% to 30%. In the conditions of data "0," the amplitude is set to "a", and the width is set to carrier wave (13.56 MHz) 128. Further in the conditions of data "1," the amplitude is set to b, and the width is set to carrier wave (13.56 MHz) 128.

On the other hand, when the data carrier 100 transmits a response signal 42 to the reader/writer device 10, as shown in FIG. 5B, the condition is set as (a) center frequency: 13.56 MHz, (b) communication speed: 105.94 kbps, (c) modulation method: load modulation (in load modulation, a High Field continuous delivery of the reader/writer device is presumed), subcarrier: 847.5 kHz (option: 423.75 kHz) and (d) modulation method: BPSK.

Figure 6A:
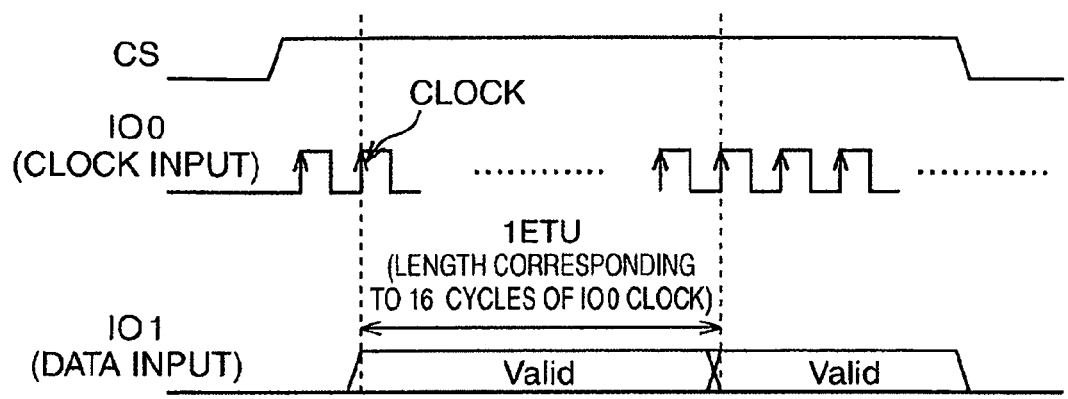
FIG. 6A is a diagram showing a reception timing to the data carrier in contact-type serial communication between the data carrier and the reader/writer device.
Figure 6B:
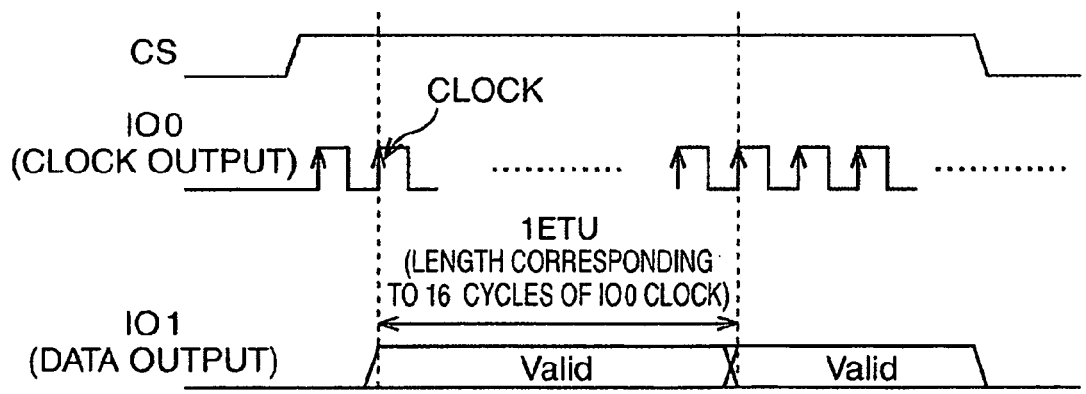
FIG. 6B is a diagram showing transmission timing from the data carrier in contact-type serial communication between the data carrier and the reader/writer device.

Further, the contact-type serial communication is performed as shown in FIGS. 6A and 6B. FIG. 6A shows a reception tag to the data carrier 100 and FIG. 6B shows a transmission timing from the data carrier 100. Here in FIGS. 6A and 6B, the "cs" represents a switching signal switching between a contactless/contact operation (Vdd inner) mode and an external power operation mode.

As shown in FIG. 6A, when a clock signal 160a ((IO0) standard: 1.695 MKHz) is input to the first contact terminal 160, the clock signal 106a is supplied to the selecting unit 130 to select to perform contact-type serial communication by the selecting unit 130.

Then, multipurpose data 170a is input and output by the second contact terminal 170. When the multipurpose data 170a is input from the second contact terminal 170, the multipurpose data 170a is downloaded in synchronization with a rising edge of the clock signal. According to the present embodiment, a reference timing is at the first timing when the multipurpose data 170a changes from "1" to "0" after reset releasing. After this process, "1ETU length" is basically a sixteen period length of the serial clock 160a.

Next, a transmission timing from the data carrier 100 to the reader/writer device 10 will be described.

As shown in FIG. 6B, data (IO1) is output in synchronization with a rising of the serial clock 160a. In this case, also, the "1ETU length" is a sixteen period length of the serial clock 160a.

As described above, the data carrier according to the present embodiment can perform both RF communication and contact-type serial communication. In addition, specifications for the RF communication protocol used in RF communications and the protocol used in contact-type serial communications can be the same. Accordingly, the control circuit can be simplified since a command control circuit for RF communications and a command control circuit for contact-type serial communications are not required independently. Further, the memory capacity for storing commands can be reduced since it is not required to prepare two types of communication protocols.

Next, a usage example of the data carrier 100 of the present embodiment, which has a configuration described above, will be described with reference to FIGS. 7A to 7D.

Figure 7A:
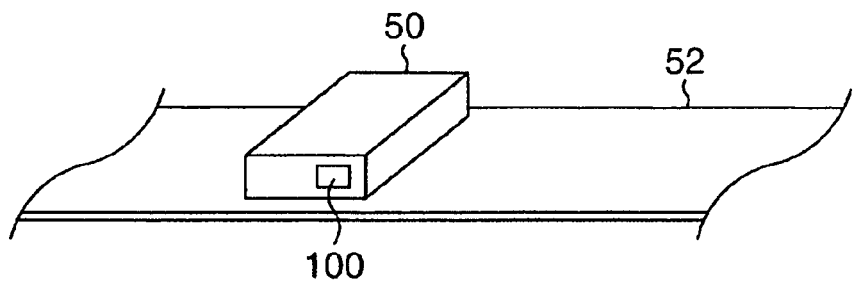
FIG. 7A is a diagram showing a case in which the data carrier is provided to a component of a device.

FIG. 7A shows the data carrier 100 attached to a device component 50. For example, the device component 50 is mounted on a conveyor belt 52 and manufacturing information such as "serial number," "date of manufacture," "names of materials" and "shipping date" are written in the data carrier 100. In this process, the proximity communication command is employed.

Figure 7B:
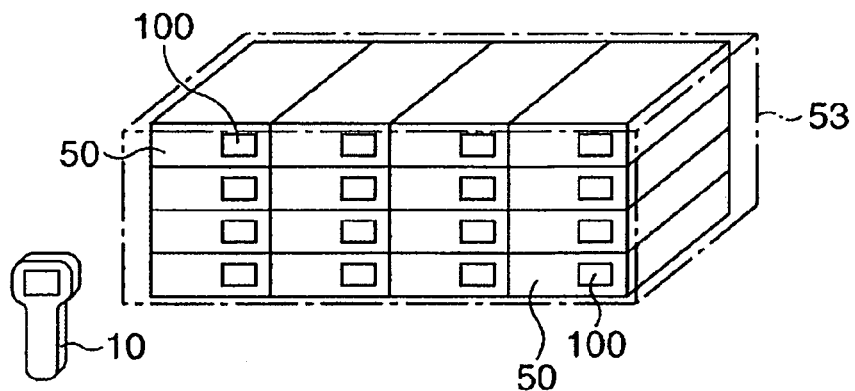
FIG. 7B is a diagram showing a case in which the data carrier provided to the component is packed in a cardboard box and shipped from a factory to be utilized in its distribution management.

FIG. 7B shows a state that the data carrier 100 attached to the device component 50 is packed in a cardboard box 53 and shipped from a factory to be used in a distribution management. In this state, the reader/writer device 10 transmits an interrogation signal 41 from outside the cardboard box 53, so the distance between the data carrier 100 and the reader/writer device 10 is larger than the distance capable of performing proximity communication. Accordingly, in this situation, the interrogation signal 41 is transmitted from the reader/writer device 10 by a vicinity communication command (VICC command).

When receiving the interrogation signal 41 by the vicinity communication command (VICC command), the data carrier 100 is required to send a response signal 42 by using a vicinity communication command (VICC command). In the data carrier 100 according to the present embodiment, as described above, both of the proximity communication command (PICC command) and the vicinity communication command (VICC command) are stored in the transmission condition setting memory 152. With this structure, both commands can be selectively used so that those commands are preferably used even when the device component 50 is packed in the cardboard box 53.

Further, in this case, not only the reader/writer device 10 carries out a "tag authentication" to authenticate the data carrier 100, but also, the data carrier 100 carries out a "mutual authentication" to authenticate the reader/writer device 10. The detail descriptions of the "tag authentication" and "mutual authentication" will later be given with reference to the flowchart in FIG. 8.

Figure 7C:
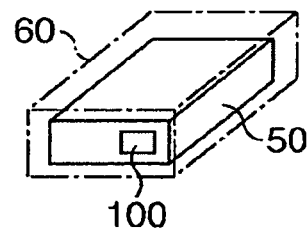
FIG. 7C is a diagram showing a case in which the component is packed alone in a cardboard box.

FIG. 7C shows a state that the device component 50 is packed alone in a cardboard box 60. The typical situation of this state is that the device components 50 are laid out in a general merchandising store. In this state, among various information stored in the data carrier 100, information such as "serial number," "maintenance information," "shipping date" and "price" are read.

Figure 7D:
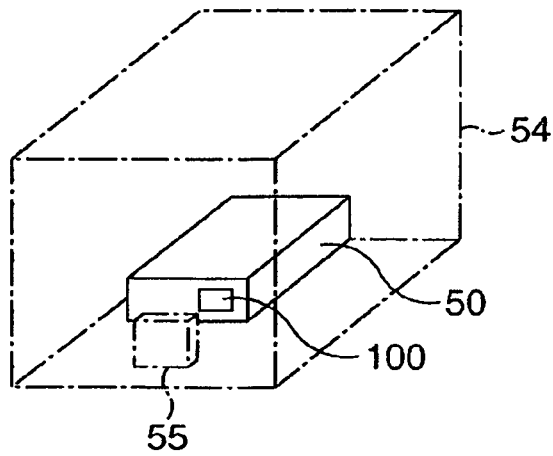
FIG. 7D is a diagram showing a case in which the component is installed in a machine body for use.

FIG. 7D shows a state that the device component 50 is installed in a device body 54. In this state, since the data carrier 100 is placed close to the reader/writer device 55 provided to the device body 54, communication between the device component 50 and the reader/writer device 55 is performed by a proximity communication command (PICC command).

An example of communication in the data carrier system using the data carrier 100 of the present embodiment will be described with reference to the flowchart FIG. 8.

As shown in FIG. 8, in the first step S601, the data carrier 100 is being standby to be turned on in response to a reception of an interrogation signal 41 of the reader/writer device 10.

When an interrogation signal 41 is transmitted from the reader/writer device 10, an operating power is generated in the data carrier 100 and the process proceeds to step S602 to determine whether or not an authentication is required based on the interrogation signal 41.

As a result of the determination, when an authentication is required, the process proceed to step S603 and the data carrier 100 determines that an anticollision process is successful.

When the anticollision process is successful, the process proceeds to step S604 to determine whether or not the authentication is a "mutual authentication." According to the result of this determination, when the authentication is not a "mutual authentication," the process proceeds to step S605 to carry out a "tag authentication." On the other hand, according to the determination result in step S604, when the authentication is a "mutual authentication," the process proceeds to step S606 to carry out a "mutual authentication." The security determinations in steps S602 and S604 are performed by the authentication command analyzing unit 1411 provided in the command control circuit 141.

As described above, the data carrier 100 of the present embodiment can set three security levels of "no authentication," "tag authentication" and "mutual authentication." In "no authentication," after the data carrier 100 is turned on, the process proceeds directly to a command receiving state in step S607, so a high-speed access is available. Further, the security level of "no authentication" can be applied to the whole area of the storage unit 150 (EEPROM memory) or only to a partial area of the memory.

In the "tag authentication" carried out in step S605, an authentication is carried out with an authentication command of a tag (data carrier). Accordingly, the reader/writer device 10 can authenticate that the data carrier 100 is legitimate. The "tag authentication" is referred to as a challenge response authentication method and a "seed value S" generated in the reader/writer device 10 is transmitted to the data carrier 100. When receiving the "seed value S," the data carrier 100 responses with a calculated "authentication value N."

The reader/writer device 10 verifies whether the "authentication value N" transmitted from the data carrier 100 is correct (a legitimate tag). Here, since the "seed value S" is scramble data, it is changed in every authentication On the other hand, the "mutual authentication" carried out in step S606 is mutually carried out by the reader/writer device 10 and the data carrier 100. According to the present embodiment, the reader/writer device 10 is authenticated first, and then, the data carrier 100 is authenticated.

That is, after the "tag authentication" described in step S605 is finished, a "seed value S'" generated in the data carrier 100 is transmitted to the reader/writer device 10. When receiving the seed value S the reader/writer device 10 responses with a calculated "authentication value N'."

As described above, after the "tag authentication" process in step S605 or the "mutual authentication" process in step S606 is finished, the process proceeds to step S607 and the data carrier 100 becomes in command reception standby state. Then, when receiving a command from the reader/ writer device 10, the data carrier 100 carries out a process according to the received command in step S608.

In step S609, the data carrier 100 determines whether or not the power is off. As a result of the determination, when the power is on, the process goes back to step S607 to be in command reception standby state. Further, as a result of the determination in step S609, when the power is off, the data carrier 100 ends the communication process with the reader/writer device 10.

As described above, three security levels of "no authentication," "tag authentication" and "mutual authentication" are provided to select and switch the setting of command type. With this structure, in the data carrier 100 having no CPU, a necessary security level can be selected among the three security levels.

Further, the data carrier 100 of the present embodiment is made to operate for vicinity communication command (VICC command) in addition to proximity communication command (PICC command). Accordingly, all of recording of manufacturing information, recording related to distribution management and usage state management in a manufacturing factory can be preferably performed with a single data carrier.

Accordingly, it is not required to provide both of a data carrier for proximity communication command (PICC command) and a data carrier of vicinity communication command (VICC command) in order to perform manufacturing process management, distribution process management and usage process management consistently. Therefore, cost required for information management can substantially be reduced.

Industrial Applicability

According to the present invention, since the command control is carried out by a single communication command controller for both communications using the RF analogue receiver and the contact communication end terminal unit, a predetermined communication protocol stored in a memory can be used for the communications. Accordingly, a data carrier capable of performing both RF communication and contact-type serial communication by using a single communication protocol can be provided. Further, an area storing an authentication command for authenticating the reader/writer device is divided into at least three areas. Among those three areas, a first area stores a first authentication command, a second area stores a second authentication command and a third area stores a third authentication command. Accordingly, the authentication methods allowing an access to the security areas can be switched according to the command transmitted from the reader/writer device. Furthermore, since a proximity communication command for performing proximity communication with the reader/writer device and a vicinity communication command for performing vicinity communication with the reader/writer device are both stored, it is possible to communicate with both a reader/writer device using a proximity command and a reader/writer device using a vicinity command.

What is claimed is:

1. A data carrier comprising:
    a communication protocol storage unit storing a communication protocol for communicating with an external communication device;
    an RF analogue receiver receiving an interrogation signal from the external communication device as an RF signal;
    a contact communication end terminal unit performing contact communication with the external communication device;
    a communication command controller controlling a command used in an RF communication protocol performed via the RF analogue receiver or a contact-type serial communication protocol performed via the contact communication end terminal unit;
    a connection selector selectively connecting one of the RF analogue receiver and the contact communication end terminal unit with the communication command controller;
    a contactless communication command controller controlling a proximity communication command for proximity communication with the external communication device mad a vicinity communication command for vicinity communication with the external communication device;
    an authentication command analyzer analyzing an authentication level to be applied to the external communication device based on the interrogation signal received from the RF analogue receiver; and
    an authentication command selector selecting an authentication command used in an authentication process with the external communication device according to an analysis result in the authentication command analyzer,
    wherein the communication command controller uses the communication protocol stored in the communication protocol storage unit to perform communication in both cases of selecting the RF analogue receiver and the contact communication end terminal unit, and
    the authentication command includes a command used in "tag authentication" communication, a command used in "mutual authentication" communication, and a command used for "no authentication" communication using a limited memory area.

2. A data carrier comprising:
    a communication protocol storage unit storing a communication protocol for communicating with an external communication device;
    an RF analogue receiver receiving an interrogation signal from the external communication device as an RF signal;
    a contact communication end terminal unit performing contact communication with the external communication device;
    a communication command controller controlling a command used in an RF communication protocol performed via the RF analogue receiver or a contact-type serial communication protocol performed via the contact communication end terminal unit;
    a connection selector selectively connecting one of the RF analogue receiver and the contact communication end terminal unit with the communication command controller;
    a contactless communication command controller controlling a proximity communication command for proximity communication with the external communication device and a vicinity communication command for vicinity communication with the external communication device;
    an authentication command analyzer analyzing an authentication level to be applied to the external communication device based on the interrogation signal received from the RF analogue receiver; and
    an authentication command selector selecting an authentication command used in an authentication process with the external communication device according to an analysis result in the authentication command analyzer,
    wherein the communication command controller uses the communication protocol stored in the communication protocol storage unit to perform communication in both cases of selecting the RF analogue receiver GP and the contact communication end terminal unit, a communication end terminal provided to the contact communication end terminal unit is for a serial clock input and serial data input and output, and the authentication command includes a command used in "tag authentication" communication, a command used in "mutual authentication" communication, and a command used for "no authentication" communication using a limited memory area.

3. A data carrier system, comprising:

a data carrier; and an external communication device communicating with the data carrier;

wherein the data carrier comprises a communication protocol storage unit storing a communication protocol for communicating with the external communication device, an RF analogue receiver receiving an interrogation signal from the external communication device as an RF signal, a contact communication end terminal unit performing contact communication with the external communication device, a communication command controller controlling a command used in an RF communication protocol performed via the RF analogue receiver or a contact-type serial communication protocol performed via the contact communication end terminal unit, a communication selector selectively connecting one of the RF analogue receiver and the contact communication end terminal unit with the communication command controller, a contactless communication command controller controlling a proximity communication command for proximity communication with the external communication device and a vicinity communication command for vicinity communication with the external communication device, an authentication command analyzer analyzing an authentication level to be applied to the external communication device based on the interrogation signal received from the RF analogue receiver, and an authentication command selector selecting an authentication command used in an authentication process with the external communication device according to an analysis result in the authentication command analyzer, wherein the communication command controller uses the communication protocol stored in the communication protocol storage unit to perform communication in both cases of selecting the RF analogue receiver and the contact communication end terminal unit, and the authentication command includes a command used in "tag authentication" communication, a command used in "mutual authentication" communication, and a command used for "no authentication" communication using a limited memory area.

4. A data carrier system, comprising:

a data carrier: and an external communication device communicating with the data carrier;

wherein the data carrier comprises a communication protocol storage unit storing a communication protocol for communicating with the external communication device, an RF analogue receiver receiving an interrogation signal from the external communication device as an RF signal, a contact communication end terminal unit performing contact communication with the external communication device, a communication command controller controlling a command used in an RF communication protocol performed via the RF analogue receiver or a contact-type serial communication protocol performed via the contact communication end terminal unit, a connection selector selectively connecting one of the RF analogue receiver and the contact communication end terminal unit with the communication command controller, a contactless communication command controller controlling a proximity communication command for proximity communication with the external communication device and a vicinity communication command for vicinity communication with the external communication device, an authentication command analyzer analyzing an authentication level to be applied to the external communication device based on the interrogation signal received from the RF analogue receiver, and an authentication command selector selecting an authentication command used in an authentication process with the external communication device according to an analysis result in the authentication command analyzer, wherein the communication command controller uses the communication protocol stored in the communication protocol storage unit to perform communication in both cases of selecting the RF analogue receiver and the contact communication end terminal unit, a communication end terminal provided to the contact communication end terminal unit is for a serial clock input and serial data input and output, and wherein the authentication command includes a command used in "tag authentication" communication, a command used in "mutual authentication" communication, and a command used for "no authentication" communication using a limited memory area.

5. The data carrier system according to claim 3, wherein said authentication command analyzer analyzes whether the type of the inquiry signal is the proximity communication command or the vicinity communication command based on a subcarrier frequency, a communication speed, or load modulation intensity of the signal received by said data carrier.

6. The data carrier system according to claim 4, wherein said authentication command analyzer analyzes whether the type of the inquiry signal is the proximity communication command or the vicinity communication command based on a subcarrier frequency, a communication speed, or load modulation intensity of the signal received by said data carrier.

* * * * *